United States Patent [19]

Guigon

[11] Patent Number: 4,533,128
[45] Date of Patent: Aug. 6, 1985

[54] DEVICE FOR SUPPORTING AND ROTATING A PART OF LARGE DIMENSIONS

[75] Inventor: Jean-Paul Guigon, Givry, France

[73] Assignee: Framatome & Cie, Courbevoie, France

[21] Appl. No.: 513,203

[22] Filed: Jul. 12, 1983

[30] Foreign Application Priority Data

Jul. 20, 1982 [FR] France .................. 82 12613

[51] Int. Cl.³ .......................................... B23K 37/04
[52] U.S. Cl. ........................................ 269/58; 269/74; 269/287; 269/289 MR
[58] Field of Search ............. 414/433, 757; 909/199, 909/200; 228/48, 10; 267/162; 188/166, 167, 83; 269/43, 58, 289 MR, 287, 74

[56] References Cited

U.S. PATENT DOCUMENTS

| | | | |
|---|---|---|---|
| 2,463,907 | 3/1949 | Risley et al. ................ | 228/48 |
| 3,052,421 | 9/1962 | Fischer ........................ | 188/83 |
| 3,181,842 | 5/1965 | Eckert ......................... | 414/433 |
| 3,868,101 | 2/1975 | Nozaki et al. ............... | 269/287 |
| 4,039,115 | 8/1977 | Randolph et al. ........... | 269/287 |
| 4,202,539 | 5/1980 | Polastri et al. .............. | 269/287 |

Primary Examiner—Robert C. Watson
Attorney, Agent, or Firm—Pollock, Vande Sande & Priddy

[57] ABSTRACT

Device for supporting and rotating a part (1) of large dimensions about its horizontal axis, comprising a frame (5) carrying a plurality of pairs of rollers (6 and 7) including at least one pair (6) of driving rollers, a cylindrical support (4) receiving the part (1) in its interior and adapted to be positioned on the rollers (6 and 7) in such a manner as to be driven in a rotational movement about its horizontal axis when the driving rollers (6) are themselves given a rotational movement. Stop elements (13 and 13') prevent rotational movement of the driving rollers (6) in the event of incorrect positioning of the cylindrical support (4) on the frame (5). The device has particular application in the manufacture of boilermaking equipment.

4 Claims, 4 Drawing Figures

DEVICE FOR SUPPORTING AND ROTATING A PART OF LARGE DIMENSIONS

FIELD OF THE INVENTION

The invention relates to a support device for a part of large dimensions, which enables the part to be rotated about its horizontal axis.

In the manufacture of boilermaking elements of very great weight, for the purpose of carrying out the various successive operations on such elements (e.g., example turning, milling, welding and checking and so on), it is necessary to be able to change the position of these elements. Thus, some operations are carried out while the boilermaking element is in a position in which its axis is vertical, while other operations are carried out while it is in a position in which its axis is horizontal. Furthermore, whether the element is in a vertical or a horizontal position, it may be necessary to turn it about its axis.

BACKGROUND OF THE INVENTION

When it is desired to turn about its horizontal axis a boilermaking part of large dimensions, and therefore of great weight, it is necessary to raise the part with the aid of a crane, to turn the part slightly, and to replace it on its horizontal support. The handling of a part of this kind is obviously a very lengthy operation and may in addition not be carried out perfectly, because the angle of rotation by which the part is turned about its axis may not be very accurate and there is a danger that the part may not be replaced accurately on its support after each handling operation.

OBJECT OF THE INVENTION

The present invention overcomes these drawbacks; it relates to a support device for a part of large dimensions, which permits rapid, accurate rotation of the part about its horizontal axis. A support device of this kind makes it possible for a certain number of operations forming part of its cycle of manufacture to be carried out on the part, without any difficulties being encountered in making changes in the position of the part which are necessary for the smooth performance of these operations.

In particular, the present invention is applicable to a vessel of a pressurized water nuclear reactor or to the vessel of a steam generator. As an example, in order to weld the partition plate of the hemispherical end member of a steam generator, it is necessary to place the end member in a position in which its axis is horizontal and, after a first welding pass, to be able to turn the end member 180° about its axis. Many other examples of boilermaking parts could of course be mentioned, for which operations are carried out while the part is in the horizontal position and is able to be turned about its axis.

SUMMARY OF THE INVENTION

The invention relates to a device for supporting a part of large dimensions, which enables the part to be rotated about its horizontal axis.

According to the invention, this support device comprises a frame carrying a plurality of pairs of rollers having horizontal axes, at least one of these pairs consisting of driving rollers, and a cylindrical support provided with means for fastening the part in its interior and adapted to be positioned on the rollers of the frame in such a manner as to be driven in a rotational movement about its horizontal axis when the driving rollers are themselves given a rotational movement.

The device is in addition provided with means for stopping the rotational movement of the driving rollers in the event of incorrect positioning of the cylindrical support on the rollers of the frame.

These stopping means are preferably composed of at least one pair of rocking contactors disposed on the frame, and against which the cylindrical support comes to bear when it is correctly positioned on the frame.

The device may also be provided with means for locking the cylindrical support in respect of axial translation relative to the frame.

These locking means consist of a circular rail fixed to the surface of the cylindrical support and adapted to slide in at least one corresponding member fixed to the frame, when the cylindrical support makes a rotary movement.

This corresponding member is preferably provided with means facilitating its engagement by the rail. It may thus be of a generally frusto-conical shape and/or be provided with resilient shock absorbing means. One preferred embodiment of this corresponding member is composed of a loose roller protected by a cap of frusto-conical shape, the cap being provided with resilient means for absorbing axial shocks.

BRIEF DESCRIPTION OF THE DRAWINGS

To enable the invention to be clearly understood, a description will now be given, by way of example, on one embodiment of the support device according to the invention, with reference to the accompanying drawings.

DETAILED DESCRIPTION

Figure 1:
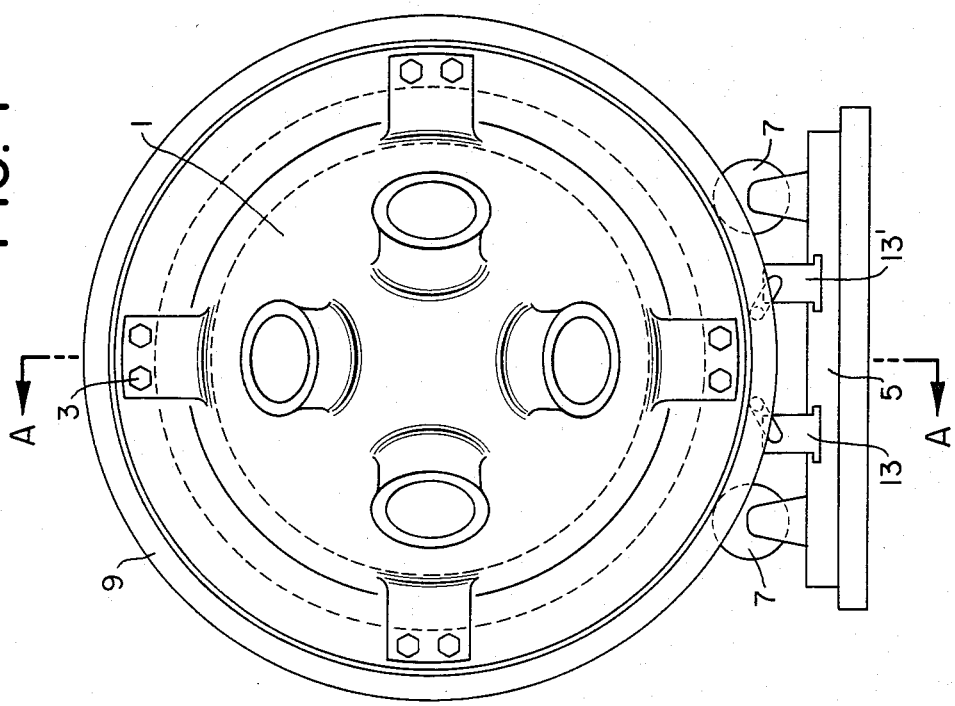
FIG. 1 shows a front view of the support device according to the invention, the horizontal axis of the part being perpendicular to the plane of the drawing.
Figure 2:
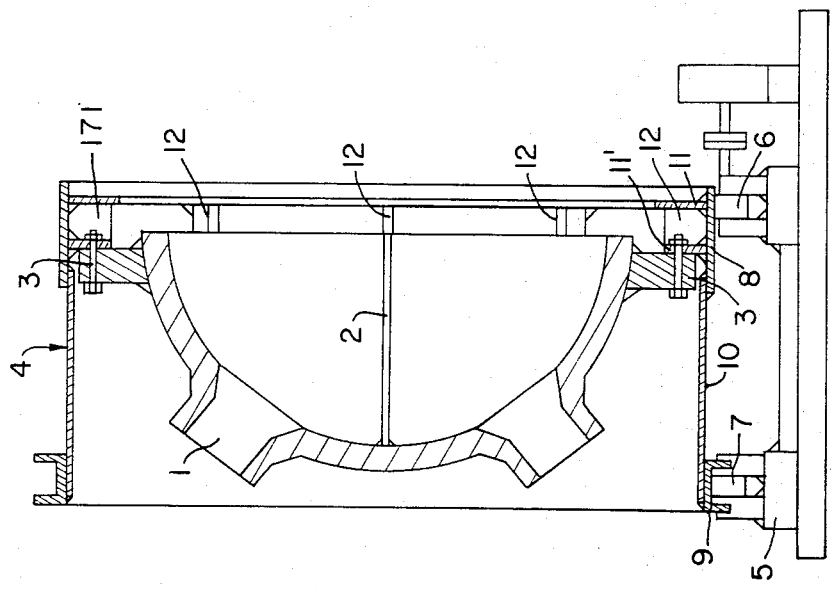
FIG. 2 is a section along line A—A in FIG. 1.

FIGS. 1 and 2 show a part of large dimensions and great weight, in this particular case consisting of a steam generator end member 1, on which it is desired to carry out the operation of welding the partition plate 2. The partition plate 2 has previously been fixed in spots to the steam generator end member in a position in which the axis of the latter was vertical. However, in order to effect correct welding of this partition plate, it is necessary for the steam generator end member to be in the horizontal position, in which the partition plate is itself in a horizontal plate. One welding pass must then be made on each side of the plate, i.e., in two positions, between which the partition plate, and therefore the entire steam generator end member, must be turned 180°.

The steam generator end member 1 has been fixed by means of bolts 3 to a cylindrical support 4, which in turn has been placed on a frame 5 provided with two pairs of rollers 6 and 7.

The rollers 6 are driving rollers connected to motors 61, while the pair of rollers 7 is a pair of loose rollers.

Figure 3:
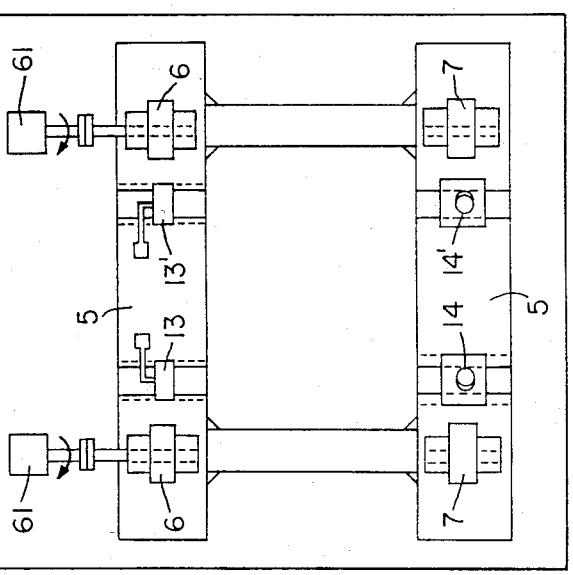
FIG. 3 shows a plan view of FIG. 1 from which the cylindrical support has been removed, leaving only the frame.

These two pairs of rollers are clearly visible in FIG. 3, which is a plan view of the frame 5.

It can be seen in FIG. 2 that the cylindrical support 4 is composed of two hoops 8 and 9 joined together by a solid sheet tube 10, the purpose of these two hoops being to reinforce the cylindrical support at the points where the support is in contact with the rollers. In addition, the steam generator end member 1 has been fixed to the cylindrical support on one of the two hoops—the hoop 8—in order to obtain a stronger fastening.

More precisely, the hoop 8 is composed of a curved flat iron member, inside which are welded two circular plates 11 and 11' stiffened by braces 12. On one of these plates 11' a flange on the steam generator end member 1 is fixed by means of the bolts 3.

The hoop 9 is composed of a channel section, the side flanges of the channel permitting the stiffening of the hoop, on the one hand, and the positioning of the hoop on the loose rollers on the other hand.

The support device according to the invention is in addition provided with a safety device making it possible to stop the rotary movement of the driving rollers 6 in the event of the incorrect positioning of the cylindrical support 4 on the frame 5. Since the part 1 is very heavy and of large dimensions, it is in fact possible for it to rock so that it no longer rests on the four rollers 6 and 7 at the same time.

This safety device is composed of a pair of contactors 13 and 13' placed on the frame 5, on the cross-member supporting the driving rollers 6. The contactors 13 and 13' are rocking contactors of a known type, which are connected in series in the control circuit of the driving rollers 6. Each of them comprises a lever adapted to assume two positions: a position of rest in which the motor does not operate when the frame 5 is empty, and a second position in which the lever is slightly depressed by the cylindrical support 4, thus enabling the rollers 6 to turn. As the contactors 13 and 13' are connected in series, it is sufficient for the cylindrical support 4 to rock on either side to bring one of the two levers 13 or 13' into the position of rest, and thus to stop the driving of the driving rollers 6.

The device according to the invention is also provided with means for locking the cylindrical support 4 in respect of axial translation relative to the frame 5. When the cylindrical support 4 performs a rotary movement through the action of the rollers on the frame 5, there is in fact a danger that a screwing phenomenon will occur, i.e. axial displacement accompanying the rotation of the support 4.

It might be thought that the engagement of the loose rollers 7 in the U-shaped hoop 9 would enable this screwing phenomenon to be avoided. However, as can be seen from FIG. 2, there is too much axial play between the loose rollers 7 and the U-shaped hoop 9 for this to be the case. This play is necessary because when the cylindrical support 4 is positioned on the frame 5, for example with the aid of a crane, such is fairly inaccurate, and there would be a risk of damaging the rollers 7 is no play existed between them and the hoop 9.

Figure 4:
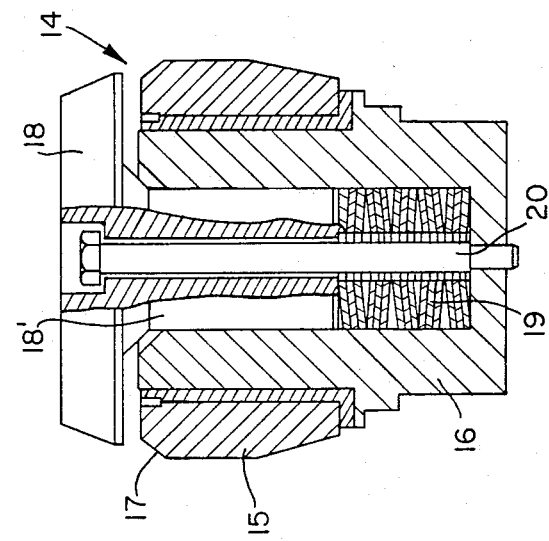
FIG. 4 shows a detail of the means for locking the cylindrical support in respect of axial translation relative to the frame.

However, as it is necessary to avoid axial translation of the support 4 relative to the frame 5 during the rotation of the support 4, two members 14 and 14' have been provided, which are mounted on the frame 5 and fit very closely into the channel of the hoop 9. Because of the lack of accuracy in the positioning of the support 4 on the frame 5, it is obviously necessary to provide, on the members 14 and 14', means facilitating their engagement by the hoop 9. It is for this reason that, as can be seen in FIG. 4, these members 14 and 14' are composed of a loose roller 15 mounted on an axle 16 and ending at the top in a bevel 17; this roller is protected by a cap 18 of frusto-conical shape. In addition, in order to damp the shocks applied to members 14 and 14' during the positioning of the support 4, the cap 18 is provided with resilient damping means composed of a stack of diaphragm springs disposed in a cavity 19 in the axle 16, the base 18' of the cap 18 coming to rest on the stack of springs. Sufficient play obviously exists between the cap 18 and the support face of the axle 16 to enable the cap to retract slightly when subjected to an axial shock. This play can be adjusted by means of a screw 20 whose head is received in a recess in the cap, while its threaded end is screwed onto the axle 16.

The device which has just been described offers numerous advantages.

It makes it possible to effect accurately the horizontal positioning of a part of large dimensions and great weight, and enables this part to be turned rapidly and accurately about its axis. In order to position the part 1 in the support 4, the latter is placed in the vertical position, the part is inserted into the support with the aid of a crane and fastened to the support by means of the bolts 3; then, with the aid of the crane, the support 4 is placed on the rollers of the frame 5. It is then possible to work on the part 1. This work is facilitated by the fact that it is certain that the axis of the part 1 is exactly horizontal, and by the fact that the part can easily be turned about its axis without the axis being displaced relative to its original position and without the part undergoing axial translation. The safety device 13, 13' makes it possible to detect any rocking of the cylindrical support 4 relative to the frame 5.

The number of pairs of loose rollers may be greater than in the embodiment described, in order to make provision for a part of great length.

Similarly, the number of contactors 13 and 13' could be greater; in particular, it would be possible to provide another pair of contactors on the cross-member carrying the loose rollers 7 in order to provide for any possible rocking of the part 1. The contactors could be placed at any other points on the frame, instead of on the cross-member supporting the driving rollers 6. This remark is also applicable to the members 14 and 14', which could be disposed elsewhere on the frame; another rail similar to the hoop 9 would then be provided.

It is obvious that the type of construction of the hoops 8 and 9 could also be varied.

It would also be possible to provide each of the members 14 and 14' with a groove giving it a U-shape receiving a rail of parallelepipedic section.

I claim:

1. Device for supporting a part (1) of large dimensions, and permitting said part to be rotated about its horizontal axis, comprising
   (a) a frame (5) carrying a plurality of pairs of rollers (6, 7) having horizontal axes, at least one of said pairs (6) consisting of driving rollers;
   (b) a cylindrical support (4) provided with means (3) for fastening said part (1) in its interior and adapted to be positioned on said rollers (6, 7) in such manner as to be driven in a rotational movement about its horizontal axis when said driving rollers (6) are themselves given a rotational movement;
   (c) means (13, 13') for stopping rotational movement of said driving rollers (6) in the event of incorrect positioning of said support (4) on said frame (5), said stopping means (13, 13') comprising at least one pair of rocking contactors (13, 13') disposed on said frame (5), and against which said support (4) abuts when it is correctly positioned on said frame (5); and (d) means (14, 14', 9) for locking said support (4) against axial translation relative to said frame (5).

2. Device for supporting a part (1) of large dimensions, and permitting said part to be rotated about its horizontal axis, comprising (a) a frame (5) carrying a plurality of pairs of rollers (6, 7) having horizontal axes, at least one of said pairs (6) consisting of driving rollers;

(b) a cylindrical support (4) provided with means (3) for fastening said part (1) in its interior and adapted to be positioned on said rollers (6, 7) in such manner as to be driven in a rotational movement about its horizontal axis when said driving rollers (6) are themselves given a rotational movement;

(c) means (13, 13') for stopping rotational movement of said driving rollers (6) in the event of incorrect positioning of said support (4) on said frame (5); and (d) means (14, 14', 9) for locking said support (4) against axial translation relative to said frame (5), said locking means comprising a circular rail (9) fixed to the surface of said support (4) and adapted to slide in at least one corresponding member (14, 14') fixed to said frame (5) when said support (4) makes a rotary movement.

3. Support device according to claim 2, wherein said corresponding members (14, 14') are each in the form of a loose roller (15) mounted on an axle and being chamfered at its upper portion.

4. Support device according to claim 3, wherein said loose roller (15) is protected by a cap (18) of frusto-conical shape provided with resilient means (19) for absorbing axial shocks.

* * * * *